United States Patent [19]
Rudolph et al.

[11] 3,898,144
[45] Aug. 5, 1975

[54] AIR-DRYING, LIGHT-CURING, UNSATURATED POLYESTER RESINS

[75] Inventors: Hans Rudolph; Hans-Joachim Traenckner; Karl Fuhr, all of Krefeld; Wolfgang Deninger, Krefeld-Bockum; Manfred Patheiger, Krefeld-Stollwerk, all of Germany

[73] Assignee: Bayer Aktiengesellschaft, Germany

[22] Filed: July 17, 1974

[21] Appl. No.: 489,119

Related U.S. Application Data

[63] Continuation of Ser. No. 317,010, Dec. 20, 1972, abandoned, which is a continuation-in-part of Ser. No. 236,960, March 22, 1972, abandoned.

[30] Foreign Application Priority Data
Mar. 23, 1971 Germany.............................. 2113998

[52] U.S. Cl. ............ 204/159.15; 260/861; 260/863; 260/867; 260/872
[51] Int. Cl.² ........................................ C08F 21/00

[58] Field of Search .......... 260/861, 863, 867, 872; 204/159.15

[56] References Cited

UNITED STATES PATENTS

| | | | |
|---|---|---|---|
| 3,226,451 | 12/1965 | Behar et al. ......................... | 260/861 |
| 3,582,487 | 6/1971 | Fuhr et al. ...................... | 204/159.15 |
| 3,607,693 | 9/1971 | Heine et al. .................... | 204/159.15 |

FOREIGN PATENTS OR APPLICATIONS

| | | | |
|---|---|---|---|
| 810,222 | 3/1959 | United Kingdom | |
| 974,892 | 11/1964 | United Kingdom................. | 260/872 |
| 989,001 | 4/1965 | United Kingdom................. | 260/863 |

*Primary Examiner*—Melvin Goldstein
*Assistant Examiner*—Earl A. Nielsen
*Attorney, Agent, or Firm*—Connolly and Hutz

[57] ABSTRACT

The present invention relates to new unsaturated polyesters and to their use in air-drying, high-curing, moulding and coating compositions.

1 Claim, No Drawings

AIR-DRYING, LIGHT-CURING, UNSATURATED POLYESTER RESINS

This application is a continuation of application Ser. No. 317,010 filed Dec. 20, 1972 and now abandoned which, in turn, is a continuation-in-part of application Ser. No. 236,960 filed Mar. 22, 1972 and now abandoned.

The present invention relates to new unsaturated polyesters and to their use in air-drying, light-curing, moulding and coating compositions.

Deutsche Auslegeschrift (German Published Specification) 1,024,654 discloses mixtures of unsaturated polyesters and copolymerisable monomeric compounds which, with the addition of auxiliaries, can be catalytically cured in air to give dry mouldings and/or coatings. The characterising feature of the unsaturated polyesters disclosed therein is that they contain $\alpha,\beta$-unsaturated carboxylic acid esters and $\beta,\gamma$-unsaturated ether radicals.

Numerous other treatises describe processes in which mixtures of unsaturated polyesters with copolymerisable monomeric compounds can be cured by means of UV-light. According to these disclosures, so-called photoinitiators as a rule serve as the auxiliaries which initiate the polymerisation. Examples of such photoinitiators are, inter alia, sulphur compounds, for example O-alkylxanthogenic acid esters which are activated in the $\beta$-position to the sulphur atom by a double bond, aromatic disulphides and thioethers containing aromatic groups; certain halogen compounds, as well as benzoin and its derivatives. The latter should be distinguished as being particularly active.

An improved process variant for the curing of the polyesters is characterised, according to Deutsche Auslegeschrift (German Published Specification) 1,694,149, in that mixtures of unsaturated polyesters and copolymerisable monomers are irradiated with UV-light, with the addition of certain benzoin compounds, and can hence be cured in an extremely short time.

For some years, large-scale industrial irradiation equipment has existed, by means of which coatings of mixtures of unsaturated polyester resins and copolymerisable monomers, containing paraffin, can be cured within 2 minutes. It has thus proved possible to achieve extremely short cycle times in processing.

Hitherto it has not been possible to make air-drying mixtures of unsaturated polyesters and copolymerisable momomers, which are described in the examples of Deutsche Auslegeschrift (German Published Specification) 1,024,654, so reactive that they can be processed using the extremely short cycle times of the polyesters containing paraffin.

This has hitherto stood in the way of their industrial application.

It has now been found, surprisingly, that the choice of a particular component mixture in the manufacture of the unsaturated polyester resin mixture according to Deutsche Auslegeschrift (German Published Specification) 1,024,654 results in an unexpected increase in reactivity which is so great that the industrial use of light-curing, air-drying unsaturated polyester resin mixtures in irradiation installations, using extremely short cycle times, that is to say cycle times of 2 minutes or less, is no longer in question.

A photopolymerizable mixture comprising

A. 70 to 10 percent by weight of an unsaturated polyester which has an acid number of from about 5 to about 55 and is the condensation product at a temperature of from about 170° to about 200°C. of
   a. 30 to 50 percent by weight of $\alpha,\beta$-unsaturated dicarboxylic acid,
   b. 10 to 30 percent by weight of a diallyl ether of a polyhydric alcohol, said alcohol being selected from the group consisting of trimethylolpropane, trimethylolethane, trimethylolbutane, pentaerythritol and glycerine,
   c. 10 to 50 percent by weight of a monohydric or polyhydric alcohol containing saturated ether groups which is selected from the group consisting of diethylene glycol, triethylene glycol, tetraethylene glycol, dipropylene glycol, the monoalkyl ethers of said glycols having from 1 to 10 carbon atoms in said monoalkyl moiety, methyl, ethyl, propyl, butyl, iso-propyl, sec-butyl, t-butyl, n-pentyl, neopentyl, n-hexyl, iso-hexyl,
   d. 0 to 10 percent by weight of an acid selected from the group consisting of phthalic acid, adipic acid, terephthalic acid, malonic acid, tetrahydrophthalic acid, hexahydrophthalic acid, succinic acid, glutaric acid and norbonenedicarboxylic acid and
   e. 0 to 30 percent by weight of a polyalcohol selected from the group consisting of ethylene glycol, propanediol-1,2, butanediol-1,3, butanediol-1,4, glycerine, trimethylolpropane, pentaerythritol, neopentyl glycol, cyclohexanediol-1,2, 2,2-bis-(p-hydroxycyclohexy)-propane and 1,4-bismethylolcyclohexane;

B. 0.1 to 4.0 percent by weight of a photoinitiator of the formula:

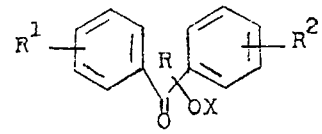

wherein R is hydrogen, alkyl having 1 to 4 carbon atoms, phenyl, benzyl or hydroxymethyl, X is hydrogen, alkyl having 1 to 4 carbon atoms, phenyl or trimethylsilyl with the proviso that R and X are not simultaneously hydrogen and $R^1$ and $R^2$ are each selected from the group consisting of hydrogen, alkyl having 1 to 4 carbon atoms, methoxy and halogen or 0.1 to 4.0 % by weight of a photoinitiator of the formula:

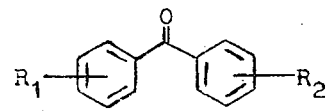

wherein $R^1$ is $CH_2-X$; $CH-X_2$; $CH_3$; $R^2$ is H; $CH_3$; $CH_2-X$; $CH-X_2$; $CX_3$ and X is chlorine, bromine, iodine and C. 10 to 70 percent weight of a copolymerizable vinyl monomer selected from the group consisting of styrene, vinyltoluene, divinylbenzene, vinyl acetate, acrylic acid and its esters with alkanols having from 1 to 6 carbon atoms, acrylonitrile, methacrylic acid and its esters with alkanols having from 1 to 6 carbon atoms, allyl acetate, allyl acrylate, phthalic acid diallyl ester, triallyl phosphate, triallyl cyanurate, N-vinylpyrolidone, N-vinylpyridine.

Examples of the photo initiators (see also Deutsche Auslegeschrift (German Published Specification) 1,694,149 and Belgian Pat. Nos. 731,589, 736,606, 736,607, 741,343 and 741,341) are benzoin-methyl-ether,-ethyl-ether, -sec -butyl-ether,-n-propyl-ether, -isopropyl-ether, -butyl-ether, -isobutyl-ether and -phenyl-ether; α-methylbenzoin-methyl-ether, α-phenylbenzoin-ethyl-ether, α-phenylbenzoin-methyl-ether, α-allylbenzoin-ethyl-ether, α-benzylbenzoin-ethyl-ether, α-hydroxymethylbenzoin and -isopropyl-ether, α-acetoxymethylbenzoinisopropyl-ether, 4-benzoyl-4-phenyl-1,3-dioxolane, α-(β-cyanoethyl)-benzoin-ethyl-ether and α-(β-carboxyethyl)-benzoin and -ethyl-ether; α(β-carboxyethyl)-benzoin-alkylethers and their salts; benzoin-trimethylsilyl-ether, α-methylbenzoin-trimethylsilyl-ether, α-ethylbenzoin-trimethylsilyl-ether, α-phenylbenzoin-trimethylsilyl-ether, 4,4'-dimethylbenzoin-trimethylsilyl-ether and 4,4'-dimethoxybenzoin-trimethylsilyl-ether.

The photopolymerisable compounds or mixtures can be stabilised by the addition of inhibitor, such as p-benzoquinone, hydroquinone, 3-methylpyrocatechol or metal compounds, in the known amounts, and can contain other customary additives. Optionally, polymerisation catalysts, for examples peroxides, can also be incorporated in amounts of 0.1 to 4 percent by weight. Suitable peroxides are, for example, tert.-butyl perbenzoate, dicumyl peroxide, benzoyl peroxide and lauroyl peroxide, and especially methyl ethyl ketone peroxide and cyclohexanone peroxide. Furthermore, the incorporation of peroxides, especially methyl ethyl ketone peroxide, is to be recommended especially if it is desired to eliminate slight discolourations of the curing products, such as can arise during irradiation but under certain circumstances also on storage, as a result of the action of light.

In conjunction with the use of ketone peroxides, metal compounds, such as cobalt naphthenate, zirconium naphthenate and vanadium naphthenate, or metal chelates, such as cobalt acetylacetonate and zirconium acetylacetonate, can be added for accelerated curing. Admittedly, the shelf life of the compositions is reduced if peroxides and metal accelerators are simultaneously present. It is therefore advisable, when manufacturing lacquer coatings, to work by the so-called active primer method, in which the coating composition is applied to a layer previously applied to the substrate and containing peroxide.

In order to protect light-sensitive substrates, for example light-coloured woods, small amounts of UV-absorbers can be added to the moulding and coating compositions without significantly impairing the reactivity. Furthermore, small amounts of carriers and fillers, as well as agents for conferring thixotropy, such as glass fibres, synthetic fibres, silica and talc, can be present during the photopolymerisation.

Natural sunlight or artificial sources of radiation, of which the emission lies in the range of 250–500 mµ, preferably 300–400 mµ, can be used as sources of radiation for carrying out the photopolymerisation. Mercury vapour lamps, xenon lamps and tungsten lamps, for example, are suitable. The compositions according to the invention also cure rapidly under the ultraviolet and visible radiation from low energy fluorescent lamps having an emission of 300–580 mµ, to give almost colourless mouldings and coatings.

In the manufacture of mouldings from the compositions sensitised according to the invention, it proves particularly advantageous that the compositions can be cured without significant exothermicity by appropriately controlled irradiation, as a result of which even fairly large mouldings are obtained free of cracks. In the absence of peroxides and metal accelerators, the curing can, if desired, also be interrupted by placing the material in the dark and can be completed at the desired point of time after the prepolymers thus obtained have been stored.

The following Examples illustrate the production and use of the new polyesters.

EXAMPLE 1a 2,550 parts by weight of fumaric acid and 451 parts by weight of 1,2-propylene glycol are slowly heated to 150° whilst passing the nitrogen over the mixture. At this temperature, 1,441 parts by weight of diethylene glycol, 941 parts by weight of trimethylolpropane-diallyl-ether, 428 parts by weight of diethylene glycol-monobutyl-ether and 0.34 part by weight of hydroquinone are added. The internal temperature is raised to 180° at the rate of 10° per hour and the condensation is carried out until 98 percent of the theoretical condensate has been liberated.

Measurements of the viscosity and acid number also permit good control of the state of the esterification. The condensation is best stopped at a viscosity of 19.5 sec. in a DIN-4 cup or at an acid number of 30. The polyester is cooled to 140°C. diluted with styrene to give a 69 percent strength solution, stabilised with 0.31 part by weight of hydroquinone and mixed with 2.5 percent of the benzoin derivatives according to the invention.

The solutions of the polyesters, thus obtained, are spread as 500 µ thick layers on glass by means of a film spreader and are irradiated, at a distance of 8 cm, for 90 seconds with a super-actinic fluorescent tube (Philips TLAK 40 watt) and subsequently for 30 seconds with a mercury high pressure lamp (Philips HTQ 70 cm). After 1 hour, the pendulum hardnesses are measured according to Albert-Koenig; they are regarded as a measure of the curing of the polyester. The pendulum hardnesses for the various photo-initiators are summarised in the table below:

| Additive, relative to form in which resin is supplied (in % by weight) | | Pendulum hardnesses in seconds |
| --- | --- | --- |
| 2.2 | α-Phenylmercaptopropiophenone | 63 |
| 2.2 | Benzoin-isopropyl-ether | 107 |
| 2.2 | Benzoin-sec.-butyl-ether | 102 |
| 2.2 | Benzoin-ethyl-ether | 102 |
| 2.2 | Benzoin-cyclohexyl-ether | 93 |
| 2.2 | α-Allylbenzoin-ethyl ether | 104 |
| 2.2 | α-Methylbenzoin-trimethylsilyl-ether | 100 |
| 2.2 | α-Methylolbenzoin | 105 |
| 2.2 | 4,4'-Dimethylbenzoin-isopropyl-ether | 104 |

After a total exposure time of 120 seconds the coatings have a scratch-resistant surface which appears hard when tested with the fingernails.

EXAMPLE 1b:
Comparison Example

An unsaturated polyester obtained by condensation of 1,765 parts by weight of maleic anhydride, 756 parts by weight of glycol, 405 parts by weight of 1,3-butanediol and 1,540 parts by weight of trimethylolpropane-diallyl-ether in the presence of 0.83 part by weight of hydroquinone is dissolved in styrene to give a 70 per cent strength by weight solution.

100 parts by weight of the resulting supply form and 1 part by weight of cobalt naphthenate solution (20 per cent strength by weight in toluene) are mixed with 2.2 parts by weight of benzoin-isopropyl-ether.

When cured as under 1a, films with pendulum hardnesses, according to Albert-Koenig, of 22 seconds are obtained.

EXAMPLE 2

2,552 parts by weight of fumaric acid and 451 parts by weight of 1,2-propylene glycol are heated to 50° in a four-neck flask with stirrer, thermometer, nitrogen inlet and descending condenser, whilst passing nitrogen over the mixture. The internal temperature is raised to 150° at the rate of 10° per hour and 1,441 parts by weight of diethylene glycol, 757 parts by weight of glycerine-diallyl-ether, 428 parts by weight of diethylene-glycol-monobutyl-ether and 0.32 part by weight of hydroquinone are added. The mixture is condensed, whilst the internal temperature rises to 170°, until a viscosity of 19.5 seconds in the DIN-4 cup and an acid number of 32 are reached. A 69 percent strength solution in styrene is prepared and 2.5 percent of benzoin-isopropyl-ether are added. Thereafter the procedure described under Example 1a is follwed. A film having a pendulum hardness, according to Albert-Koenig, of 84 seconds, is obtained.

The following polyesters are produced which following the prescriptions given in the preceding examples 1a and 2 and employing the following components and quantities, the parts being parts by weight.

EXAMPLE 3

2,552 parts of fumaric acid, 451 parts of propylen glycol-1,2, 1,558.2 parts of diethylenglycol, 941.6 parts of trimethylolpropane-diallylether and 0.76 parts by weight of hydroquinone. The acid number is 35.

68 parts of these polyesters are dissolved in 29.5 parts of styrene and 2.5 parts of benzoin-isopropyl-ether are added to the solution. The viscosity is about 1,030 c P. After irradiating a film as obtained according to Example 1a for 90 seconds under a super-actinic fluorescent tube and for 30 seconds under a mercury high pressure lamp, each time in a distance of 8 cm, this pendulum hardness according to Albert-Koenig after 1 hour storage in the dark is 122 seconds.

EXAMPLE 4

2,552 parts by fumaric acid; 451 parts of propyleneglycol-1.2; 2,204.4 parts of triethylene-glycol, 941 parts of trimethylolpropane-diallyl-ether, 0.86 parts of hydroquinone. Acid number 28.5; pendulum hardness 102 seconds.

EXAMPLE 5

2,552 parts of fumaric acid; 522.7 parts of butanediol-1,3; 1,558.2 parts of diethylene glycol, 968.0 parts of trimethylolethane-diallyl-ether, 0.78 parts of hydroquinone. Acid number 35; pendulum hardness 105 seconds.

EXAMPLE 6

2,552 parts of fumaric acid; 451 parts of propylene glycol-1,2; 1,558.2 parts of diethylene glycol; 854.6 parts of pentaerythritol-diallyl-ether; 0.78 parts of hydroquinone. Acid number 37, pendulum hardness 104 seconds.

EXAMPLE 7

68 parts of the polyester according to Example 1 are dissolved in 29.5 parts of ethyl acrylate and 2.5 parts of 4-dichloromethyl-benzophenone chloride are added to the solution. The viscosity of the solution is 1,100 cP. After irradiating a film corresponding to Example 1a for 90 seconds under super actinic fluorescent tubes and for 30 seconds under a mercury high pressure lamp each time in a distance of 8 contimeters, the pendulum hardness according to Albert-Koenig is 96 seconds.

What we claim is:
1. A photopolymerizable mixture comprising
   A. 70 to 10 percent by weight of an unsaturated polyester which has an acid number of from about 5 to about 55 and is the condensation product at a temperature of from about 170° to about 200°C. of
      a. 30 to 50 percent by weight of $\alpha,\beta$-unsaturated dicarboxylic acid,
      b. 10 to 30 percent by weight of a diallyl ether of a polyhydric alcohol, said alcohol being selected from the group consisting of trimethylolpropane, trimethylolethane, trimethylolbutane, pentaerythritol and glycerine,
      c. 10 to 50 percent by weight of a monohydric or polyhydric alcohol containing saturated ether groups which is selected from the group consisting of diethylene glycol, triethylene glycol, tetraethylene glycol, dipropylene glycol, the monoalkyl ethers of said glycols having from 1 to 10 carbon atoms in said monoalkyl moiety, methyl, ethyl, propyl, butyl, iso-propyl, sec-butyl, t-butyl, n-pentyl, neo-pentyl, n-hexyl, iso-hexyl,
      d. 0 to 10 percent by weight of an acid selected from the group consisting of phthalic acid, adipic acid, terephthalic acid, malonic acid, tetrahydrophthalic acid, hexahydrophthalic acid, succinic acid, glutaric acid and norbonenedicarboxylic acid and
      e. 0 to 30 percent by weight of a polyalcohol selected from the group consisting of ethylene glycol and propanediol-1,2, butanediol-1,3, butanediol-1,4, glycerine, trimethylolpropane, pentaerythritol, neopentyl glycol, cyclohexanediol-1,2, 2,2-bis-(p-hydroxycyclohexyl)-propane and 1,4-bismethylolcyclohexane;
   B. 0.1 to 4.0 percent by weight of a photoinitiator of the formula:

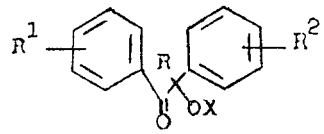

wherein R is hydrogen, alkyl having 1 to 4 carbon atoms, phenyl, benzyl or hydroxymethyl, X is hydrogen, alkyl having 1 to 4 carbon atoms, phenyl or trimethylsilyl with the proviso that R and X are not simultaneously hydrogen and $R^1$ and $R^2$ are each selected from the group consisting of hydrogen, alkyl having 1 to 4 carbon atoms, methoxy and halogen or 0.1 to 4.0 percent by weight of a photoinitiator of the formula:

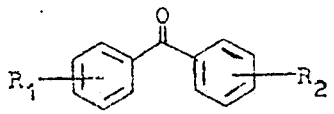

wherein $R^1$ is $CH_2-X$; $CH-X_2$; $CH_3$; $R^2$ is H; $CH_3$; $CH_2-X$; $CH-X_2$;$CX_3$ and X is chlorine, bromine, iodine and C. 10 to 70 percent by weight of a copolymerizable vinyl monomer selected from the group consisting of styrene, vinyltoluene, divinylbenzene, vinyl acetate, acrylic acid and its esters with alkanols having from 1 to 6 carbon atoms, acrylonitrile, methacrylic acid and its esters with alkanols having from 1 to 6 carbon atoms, allyl acetate, allyl acrylate, phthalic acid diallyl ester, triallyl phosphate, triallyl cyanurate, N-vinylpyrolidone, N-vinylpyridine.

* * * * *